(12) United States Patent
Yoo

(10) Patent No.: US 12,447,787 B2
(45) Date of Patent: Oct. 21, 2025

(54) SUSPENSION SYSTEM FOR A VEHICLE

(71) Applicants: HYUNDAI MOTOR COMPANY, Seoul (KR); KIA CORPORATION, Seoul (KR)

(72) Inventor: Sang Hoon Yoo, Asan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 541 days.

(21) Appl. No.: 17/947,781

(22) Filed: Sep. 19, 2022

(65) Prior Publication Data

US 2023/0173863 A1 Jun. 8, 2023

(30) Foreign Application Priority Data

Dec. 2, 2021 (KR) .......... 10-2021-0170968

(51) Int. Cl.
*B60G 11/16* (2006.01)

(52) U.S. Cl.
CPC ........ *B60G 11/16* (2013.01); *B60G 2204/124* (2013.01); *B60G 2206/71* (2013.01); *B60G 2206/73* (2013.01)

(58) Field of Classification Search
CPC .... B60G 2204/12422; B60G 2204/124; B60G 11/16; B60G 11/14; B60G 2206/42; B60G 2204/44; F16F 1/122
See application file for complete search history.

(56) References Cited

U.S. PATENT DOCUMENTS

| | | | | |
|---|---|---|---|---|
| 5,467,970 A | * | 11/1995 | Ratu | B60G 7/04 267/152 |
| 2005/0225051 A1 | * | 10/2005 | Bennett | B60G 11/16 280/124.179 |
| 2007/0013161 A1 | * | 1/2007 | Rhein | B60G 11/14 280/124.162 |
| 2010/0314842 A1 | * | 12/2010 | Rodenbeck | B60G 17/0152 267/196 |
| 2019/0023097 A1 | * | 1/2019 | Welch | B60G 17/021 |
| 2022/0288989 A1 | * | 9/2022 | Cho | B60G 11/16 |
| 2024/0190195 A1 | * | 6/2024 | Yoo | B60G 3/06 |

FOREIGN PATENT DOCUMENTS

| | | | | |
|---|---|---|---|---|
| EP | 3831624 A1 | * | 6/2021 | |
| JP | 2002021904 A | * | 1/2002 | .......... B60G 15/063 |
| JP | 2010156387 A | * | 7/2010 | |
| KR | 20080052760 A | | 6/2008 | |

OTHER PUBLICATIONS

Yokoyama, Shock Absorber and Suspension Device, Jul. 15, 2010, EPO, JP 2010156387 A, Machine Translation of Description (Year: 2010).*

* cited by examiner

*Primary Examiner* — Paul N Dickson
*Assistant Examiner* — Matthew D Lee
(74) *Attorney, Agent, or Firm* — Lempia Summerfield Katz LLC

(57) ABSTRACT

A suspension system has a spring which may be prevented from being completely withdrawn and separated from a spring pad even in a situation in which an additional rebound further occurs in a full-rebound state and the spring deviates from a range (a free height of the spring) in which the spring can be extended.

12 Claims, 9 Drawing Sheets

SUSPENSION SYSTEM FOR A VEHICLE

CROSS-REFERENCE TO RELATED APPLICATION

The present application claims priority to Korean Patent Application No. 10-2021-0170968, filed Dec. 2, 2021, the entire contents of which are incorporated herein for all purposes by this reference.

BACKGROUND

Field of the Disclosure

The present disclosure relates to a suspension system for a vehicle, and more particularly, to a suspension system having a configuration capable of preventing withdrawal of a spring for connecting a suspension arm and a vehicle body member even when an additional rebound situation occurs during a full-rebound situation while a vehicle travels.

Description of the Related Art

Recently, with respect to European vehicles having improved handling performance, there has been a trend in tuning vehicles to have gradually increased stiffness properties. In addition, the vehicles are tending to be lighter in weight in order to be more environmentally friendly.

In order to implement a vehicle having increased rigidity or stiffness i.e., a wheel rate, which is generated when a tire receives a vertical load, needs to be high, and rigidity or stiffness of a spring connecting a suspension arm and a vehicle body member needs to be increased to increase the wheel rate.

Further, when a load of the vehicle is decreased, a force for compressing the spring is decreased. As a result, a compression amount of the spring is decreased.

The compression amount of the spring is further decreased when the tire receives the vertical load in the case in which the load or weight of the vehicle is decreased to be more environmentally friendly in the state in which the rigidity of the spring is increased to satisfy the stiffness property of the vehicle as described above. For this reason, there is a drawback in that the spring connecting the suspension arm and the vehicle body member may be withdrawn in a situation in which an additional rebound occurs in a full-rebound situation while the vehicle travels. For example, this may be a situation in which the spring deviates from a range in which the spring can be extended, (i.e., a situation in which the spring deviates from a free height of the spring), i.e., a situation in which the tire passes a deep puddle. For this reason, there is a problem in that an accident such as a rollover of the vehicle may occur.

A wheel stroke of the vehicle needs to be decreased in order to prevent the withdrawal of the spring. However, because the wheel stroke of the vehicle is a main factor that affects performance and marketability of the vehicle, it is not easy to change the wheel stroke.

The foregoing explained as the background is intended merely to aid in understanding the background of the present disclosure. The foregoing is not intended to mean that the present disclosure falls within the purview of the related art that is already known to those of ordinary skill in the art.

SUMMARY

The present disclosure has been made in an effort to provide a suspension system for a vehicle, where the suspension system has a configuration capable of preventing withdrawal of a spring connecting a suspension arm and a vehicle body member even in a situation in which an additional rebound occurs in a full-rebound situation while a vehicle travels, i.e., even in a situation in which the spring deviates from a range (i.e., a free height of the spring) in which the spring can be extended, thereby improving stability of the vehicle.

To achieve the above-mentioned object, the present disclosure provides a suspension system for a vehicle. The suspension system includes a spring pad coupled to a spring configured to connect a suspension arm and a vehicle body. The spring pad is configured to support the spring. The spring pad includes a vehicle body coupling part coupled to be in contact with the vehicle body and a spring assembling part formed along an outer periphery of the vehicle body coupling part. An end of the spring is inserted into the spring assembling part. The spring pad also includes a guide part connected to the vehicle body coupling part and extending downward from the spring assembling part. The guide part is configured to guide a movement of the spring when the end of the spring separates from the spring assembling part and prevent the spring from being withdrawn from the spring pad.

The vehicle body coupling part may include a cup portion having a concave groove protruding downward and a circular flange portion extending horizontally from an upper end of the cup portion. The vehicle body may correspond in shape to the cup portion and the flange portion and be installed to be in contact with an inner surface of the cup portion and an upper surface of the flange portion.

A plurality of debossed grooves may be formed in the inner surface of the cup portion and the upper surface of the flange portion. Stepped structures may be formed between parts in which the debossed grooves are formed and parts in which the debossed groove are not formed, such that surfaces of the parts in which the debossed groove are not formed may be in contact with the vehicle body.

A vehicle body fixing protrusion may protrude from the vehicle body coupling part. The vehicle body fixing protrusion may be coupled to the vehicle body while penetrating the vehicle body.

The spring assembling part may be provided in the form of a groove having an arc-shaped cross-section matched with a cross-section of the spring. A plurality of spring contact protrusions may protrude from the spring assembling part. The spring fitted with the spring assembling part may be installed to be in contact with the spring contact protrusions.

A portion where a lower end of the spring assembling part and an upper end of the guide part are connected may be formed as a stepped portion protruding outward. The stepped portion may support the spring fitted with the spring assembling part.

The spring pad including the vehicle body fixing protrusion may be made of a plastic material to ensure stiffness or rigidity. The vehicle body fixing protrusion made of the plastic material may be fixedly coupled to the vehicle body by managing tolerance with a hole formed through the vehicle body.

The spring pad including the vehicle body fixing protrusion may be made of a plastic material to ensure stiffness or rigidity. An end of the vehicle body fixing protrusion made of the plastic material may be formed as an inclined surface to improve assembly properties when the vehicle body fixing protrusion penetrates the vehicle body.

The spring pad including the vehicle body fixing protrusion may be made of a rubber material to absorb impact and prevent noise. An end of the vehicle body fixing protrusion made of the rubber material may have an arrowhead shape to ensure a fixing force after the vehicle body fixing protrusion penetrates the vehicle body.

The spring pad including the vehicle body fixing protrusion may be made of a rubber material. A coating member may be coupled to surfaces of the spring assembling part and the guide part to reduce friction with the spring.

The spring pad may be made of a rubber material. An inner steel member made of a steel material may be coupled in the vehicle body coupling part to maintain a shape of the spring pad.

The spring may be compressed and the end of the spring may be kept fitted with the spring assembling part in an empty vehicle situation or in the event of a bump. The spring may be extended and the end of the spring may be kept fitted with the spring assembling part in a normal full-rebound situation in which the spring does not deviate from a free height of the spring. When an additional rebound further occurs in the full-rebound situation, the end of the spring may be separated from the spring assembling part. The end of the spring separated from the spring assembling part may be guided by the guide part such that the spring may be prevented from being withdrawn from the spring pad.

When the situation in which the additional rebound further occurs in the full-rebound situation is released, the extended spring may be compressed again. The end of the spring guided by the guide part may be inserted into the spring assembling part again when the spring is compressed such that the spring may return to a state in which the spring is coupled to the spring pad.

In the suspension system according to the present disclosure, the spring may be prevented from being completely withdrawn and separated from the spring pad even in the situation in which the additional rebound further occurs in the full-rebound situation and the spring deviates from the range (i.e., the free height of the spring) in which the spring can be extended. As a result, it is possible to prevent the occurrence of an accident such as a rollover of the vehicle. Thus, marketability may be improved by improving stability of the vehicle.

In addition, embodiments according to the present disclosure are configured to prevent the withdrawal of the rear wheel spring in the event of the full rebound of the vehicle having a high wheel rate like a tuned and high-performance vehicle in which the handling is preferentially considered. As a result, it is possible to ensure an additional rebound stroke. More particularly, it is possible to ensure excellent ride quality by improving impact shock even in the case of a high-performance vehicle.

DETAILED DESCRIPTION OF THE DISCLOSURE

Figure 1:
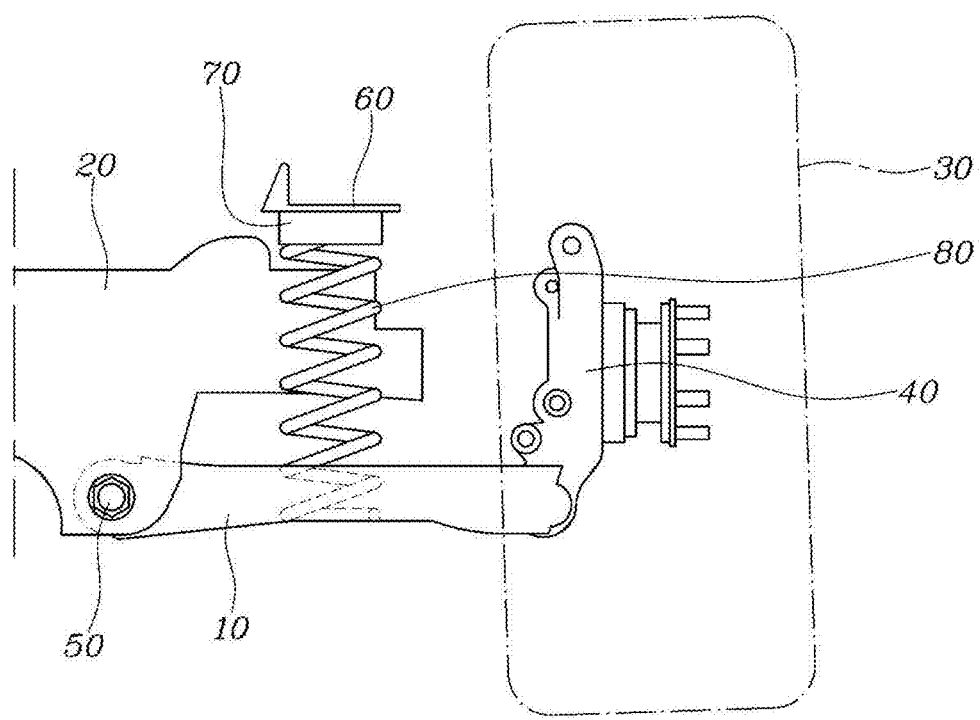
FIG. 1 is a view illustrating a suspension system for a vehicle according to the present disclosure in which a spring pad is coupled to a vehicle body in an empty vehicle state.
Figure 2:
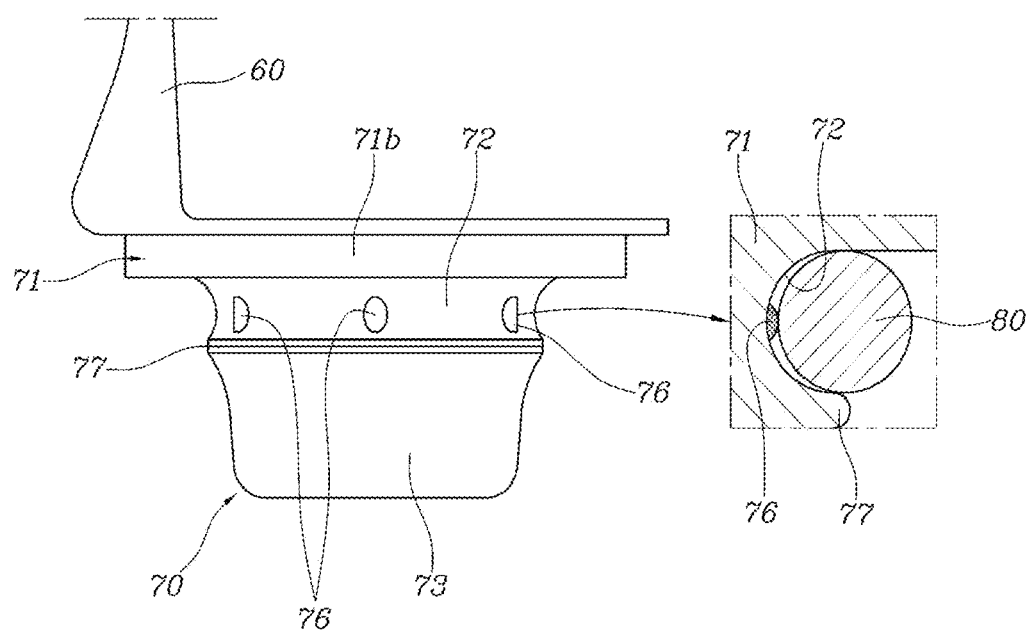
FIG. 2 is a front view of the spring pad illustrated in FIG. 1.
Figure 3:
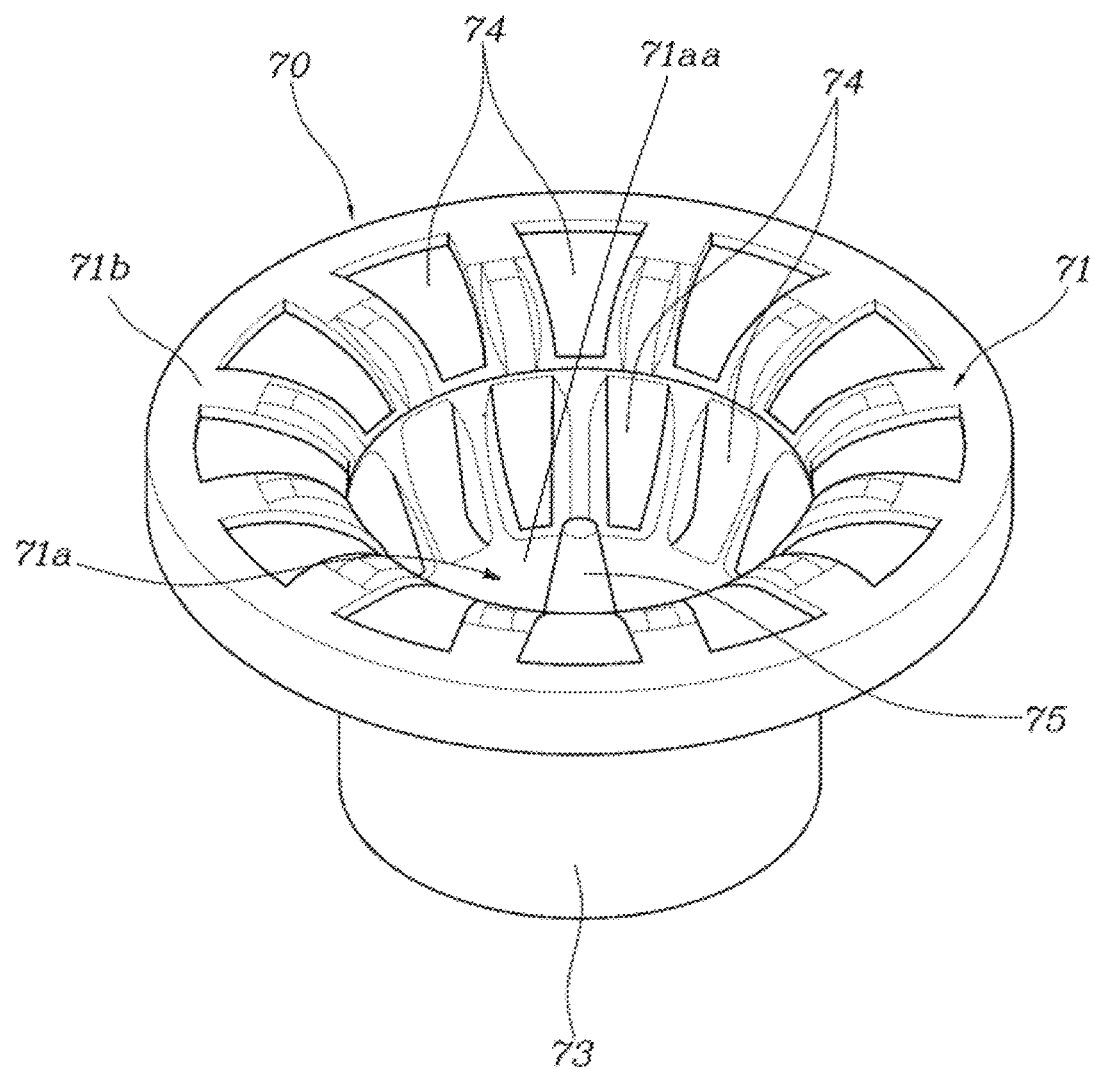
FIG. 3 is a perspective view of the spring pad.

Specific structural or functional descriptions of embodiments of the present inventive concept disclosed in this specification or application are described only for the purpose of explaining the embodiments according to the present inventive concept. The embodiments according to the present inventive concept may be carried out in various forms. It should not be interpreted that the present inventive concept is limited to the embodiments described in this specification or application.

Because the embodiments according to the present disclosure may be variously changed and may have various forms, specific embodiments are illustrated in the drawings and described in detail in the present specification or application. However, the descriptions of the specific embodiments herein are not intended to limit embodiments according to the concept of the present disclosure to the specific embodiments disclosed herein. It should be understood that the present inventive concept covers all modifications, equivalents, and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and that an intervening constituent element can also be present between the constituent elements. When one constituent element is described as being "coupled directly to" or "connected directly to" another constituent element, it should be understood that no intervening constituent element is present between the constituent elements. Other expressions, such as "between" and "just between" or "adjacent to" and "directly adjacent to", for explaining a relationship between constituent elements should be interpreted in a similar manner.

The terms used in the present specification are used only for the purpose of describing particular embodiments and are not intended to limit the present disclosure. Singular expressions include plural expressions unless clearly described as otherwise in the context. In the present specification, it should be understood the terms "comprises," "comprising," "includes," "including," "contains," "containing," "has," "having," or other variations thereof are inclusive and therefore specify the presence of stated features, numbers, steps, operations, elements, components, or combinations thereof. However, such terms do not preclude the presence or addition of one or more other features, numbers, steps, operations, elements, components, or combinations thereof.

Unless otherwise defined, all terms used herein, including technical or scientific terms, have the same meaning as commonly understood by those of ordinary skill in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to an embodiment of the present disclosure may be implemented by a non-volatile memory (not illustrated) configured to store an algorithm for controlling operations of various constituent elements in a vehicle or to store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, a suspension system for a vehicle according to an embodiment of the present disclosure is described with reference to the accompanying drawings.

FIGS. 1-9 illustrate an example of a multi-link type rear wheel suspension system for explaining the present disclosure.

As illustrated, the suspension system for a vehicle according to the present disclosure is configured such that one end of a suspension arm 10 is connected to a vehicle body frame 20 and the other end of the suspension arm 10 is connected to a knuckle 40 of a tire 30.

The suspension arm 10 is a rear wheel lower arm and the vehicle body frame 20 is a rear wheel sub-frame or a cross member.

A suspension arm bushing is coupled to one end of the suspension arm 10. A bolt 50 penetrates the suspension arm bushing and the vehicle body frame 20 and is fastened to a nut, such that one end of the suspension arm 10 is coupled to the vehicle body frame 20.

The other end of the suspension arm 10 is coupled to the knuckle 40.

An embodiment according to the present disclosure includes a spring pad 70 and a spring 80. The spring pad 70 is fixedly coupled to a vehicle body 60 positioned above the suspension arm 10. The spring 80 has a lower end supported on the suspension arm 10 and an upper end coupled to and supported on the spring pad 70 fixed to the vehicle body member 60.

The vehicle body 60 is a side member and the spring 80 is a coil spring that connects the suspension arm 10 and the vehicle body 60 through the spring pad 70.

The spring pad 70 according to an embodiment of the present disclosure includes a vehicle body coupling part 71 coupled to and in contact with the vehicle body 60. The spring pad 70 further includes a spring assembling part 72 formed along an outer periphery of the vehicle body coupling part 71. An end (upper end) of the spring 80 is inserted into the spring assembling part 72. A guide part 73 is connected to the vehicle body coupling part 71 and extends downward from the spring assembling part 72. The guide part 73 is configured to guide a movement of the spring 80 and prevent the separation of the spring 80 from the spring pad 70 when an end of the spring 80 is separated from the spring assembling part 72.

The vehicle body coupling part 71 includes a cup portion 71a having a concave groove 71a protruding downward and a circular flange portion 71b extending horizontally from an upper end of the cup portion 71a.

The vehicle body 60 corresponds in shape to the cup portion 71a and the flange portion 71b and is installed to be in contact with an inner surface of the cup portion 71a and an upper surface of the flange portion 71b.

According to an embodiment of the present disclosure, a plurality of debossed grooves 74 is formed in an inner surface of the cup portion 71a and an upper surface of the flange portion 71b. Stepped structures are formed between the parts in which the debossed grooves 74 are formed and the parts in which the debossed groove 74 are not formed, such that surfaces of the parts in which the debossed groove 74 are not formed are in contact with the vehicle body 60.

Since the spring pad 70 according to the present disclosure has the plurality of debossed grooves 74, it is possible to reduce the weight or optimize the weight. Further, the plurality of debossed grooves 74 is formed to ensure the stepped structure to obtain seating performance with the vehicle body 60, thereby further improving a coupling force with the vehicle body 60.

To ensure the coupling force between the vehicle body 60 and the spring pad 70, a vehicle body fixing protrusion 75 protrudes upward from a vehicle body coupling part 71 of the spring pad 70. The vehicle body fixing protrusion 75 is coupled to the vehicle body 60 while penetrating the vehicle body 60.

In other words, the vehicle body fixing protrusion 75 protrudes upward from a bottom surface of the cup portion 71a of the spring pad 70. A hole 61 is formed in a bottom of the vehicle body 60 inserted into the cup portion 71a. The spring pad 70 and the vehicle body 60 are coupled as the vehicle body fixing protrusion 75 protrudes while penetrating the hole 61.

The spring assembling part 72 of the spring pad 70 is provided in the form of a groove having an arc-shaped cross-section and having a curvature matched with a cross-section of the spring 80. A plurality of spring contact protrusions 76 protrudes from the spring assembling part 72. The spring 80 fitted with the spring assembling part 72 is installed to be in contact with the spring contact protrusions 76.

In other words, the upper end of the spring 80 fitted with the spring assembling part 72 may be in point contact with the plurality of spring contact protrusions 76 formed on the spring assembling part 72. Friction between the spring assembling part 72 and the upper end of the spring 80 is thereby reduced.

When the friction between the spring assembling part 72 and the upper end of the spring 80 is reduced by the point contact with the spring contact protrusion 76, it is possible to allow the upper end of the spring 80 to smoothly slide and separate from the spring assembling part 72 when an additional rebound further occurs in the full-rebound state.

When an additional rebound further occurs in the full-rebound state, the downward extension of the spring 80 further increases in comparison with the full-rebound state. In this case, if the upper end of the spring 80 is not smoothly separated from the spring assembling part 72, the spring pad 70 is also excessively pulled downward by the excessive extension of the spring 80. This causes damage to the durability of the spring pad 70.

Therefore, in an embodiment according to the present disclosure, the friction between the spring assembling part 72 and the upper end of the spring 80 may be reduced by the point contact with the spring contact protrusion 76. Thus, the upper end of the spring 80 may smoothly slide and separate from the spring assembling part 72 when an additional rebound occurs in a full-rebound state. Damage to the durability of the spring pad 70 otherwise caused by the extension of the spring 80 is thereby prevented.

In addition, in an embodiment according to the present disclosure, a portion at which a lower end of the spring assembling part 72 and an upper end of the guide part 73 are connected is formed as a stepped portion 77 protruding outward. The stepped portion 77 supports the spring 80 fitted with the spring assembling part 72.

Since the stepped portion 77 supports the spring 80, the upper end of the spring 80 does not separate from the spring assembling part 72 when the full rebound occurs. Only when the additional rebound occurs in the full-rebound state is a tensile force of the spring 80 higher than a supporting force of the stepped portion 77. Thus, the upper end of the spring 80 separates from the spring assembling part 72.

As illustrated in FIGS. 2-7, in a first embodiment of the spring pad 70 according to the present disclosure, all the portions including the vehicle body fixing protrusion 75 are made of a plastic material to ensure stiffness or rigidity. The vehicle body fixing protrusion 75 made of a plastic material is fixedly coupled to the vehicle body 60 by managing tolerance with the hole 61 formed through the vehicle body 60.

An end of the vehicle body fixing protrusion 75 made of a plastic material is formed as an inclined surface 75*a*. Therefore, the vehicle body fixing protrusion 75 may smoothly penetrate the hole 61 of the vehicle body 60.

Because of the inclined surface 75*a*, the vehicle body fixing protrusion 75 has a pointy shape having a cross-section that gradually decreases toward the end of the vehicle body fixing protrusion 75.

Figure 9:
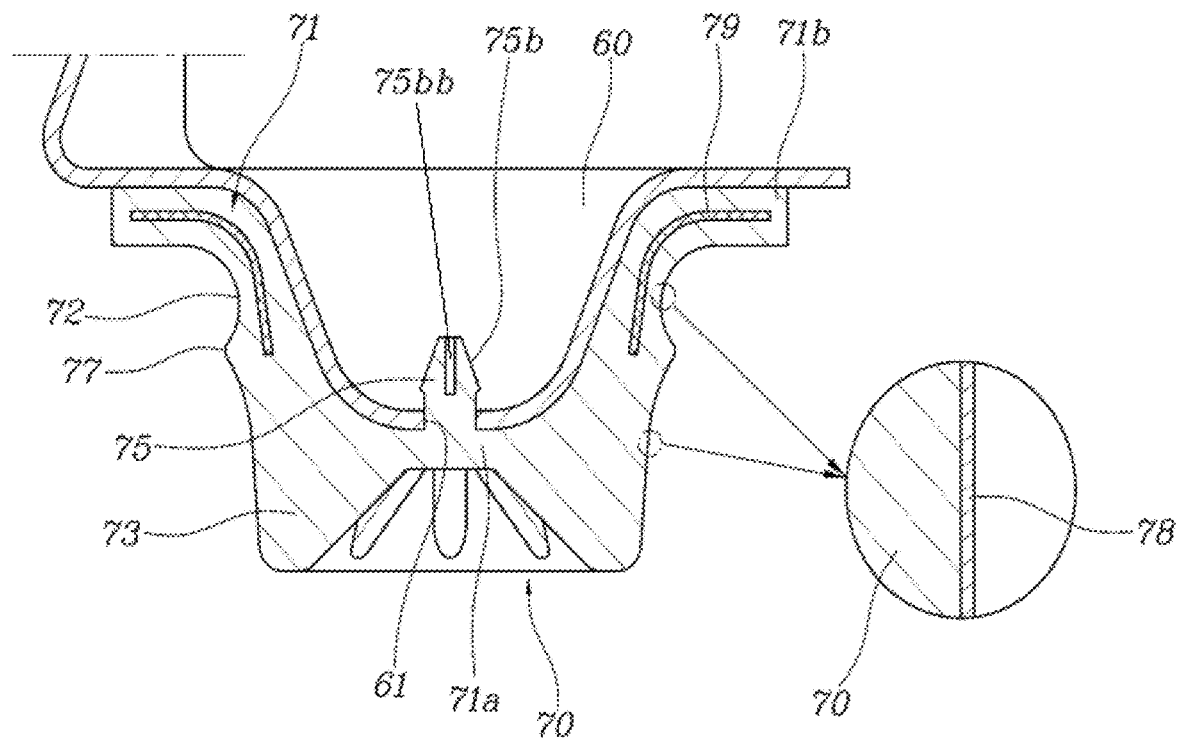
FIG. 9 is a cross-sectional view of an embodiment in which the spring pad according to the present disclosure is made of a rubber material.

As illustrated in FIG. 9, in another embodiment of the spring pad 70 according to the present disclosure, all the portions including the vehicle body fixing protrusion 75 are made of a rubber material to absorb impact and prevent noise.

The spring 80 is made of steel and all the portions, including the vehicle body fixing protrusion 75, of the spring pad 70 may be made of a rubber material or a material having elasticity to prevent impact, noise, and chipping that occur when parts made of steel come into contact with each other.

The end of the vehicle body fixing protrusion 75 made of a rubber material may have a shape of an arrowhead 75b to ensure a fixing force after the vehicle body fixing protrusion 75 penetrates the hole 61 of the vehicle body 60. However, the present disclosure is not limited thereto. The end of the vehicle body fixing protrusion 75 may include a slit 75*bb*, for example, the slit 75*bb* may be disposed at the middle of the end of the vehicle body fixing protrusion 75.

In addition, when the spring pad 70 is made of a rubber material, the frictional force between the spring pad 70 and the spring 80 increases, the spring pad 70 may be damaged because of an increase in frictional force, or the upper end of the spring 80 may not smoothly slide and separate from the spring assembling part 72 when the additional rebound further occurs in the full-rebound state. To prevent this problem, in an embodiment according to the present disclosure, a coating member 78 is coupled to surfaces of the spring assembling part 72 and the guide part 73 of the spring pad 70 that are in contact with the spring 80. Friction between the spring pad 70 and the spring 80 is thereby reduced.

In addition, in the case in which the spring pad 70 is made of a rubber material, an inner steel member 79 made of a steel material may be coupled in the vehicle body coupling part 71 to maintain a shape of the spring pad 70.

The inner steel member 79 is coupled to be positioned inside the spring assembling part 72.

Figure 4:
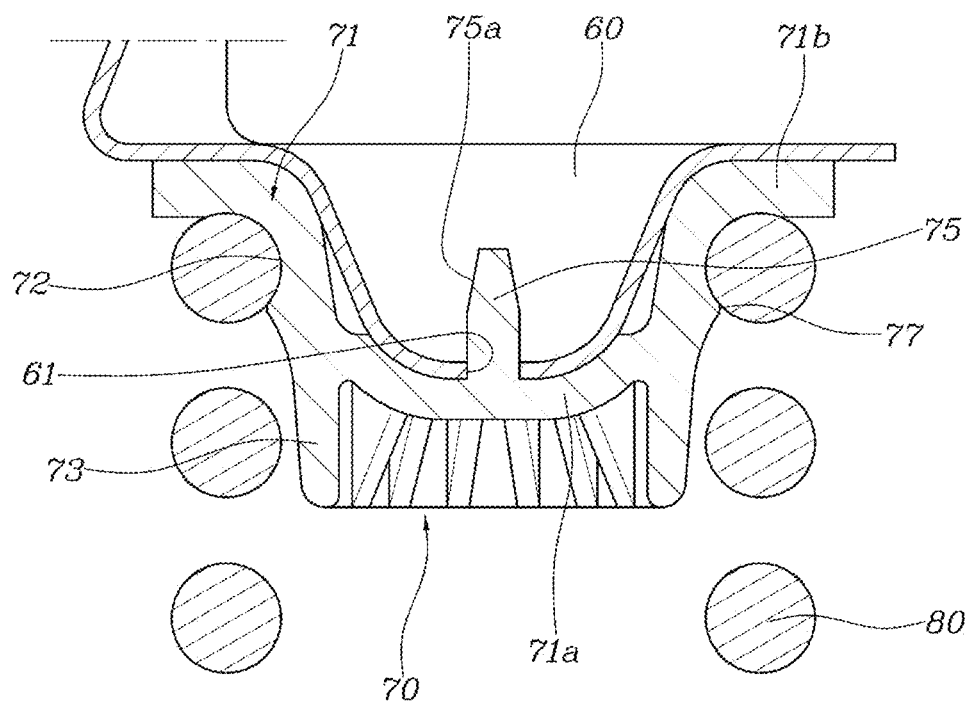
FIG. 4 is a cross-sectional view of FIG. 2.

FIG. 1 is a view illustrating an empty vehicle state and FIG. 4 is a view illustrating states of the spring pad 70 and the spring 80 in the empty vehicle state.

In the empty vehicle state, the spring 80 is in a normal state in which the spring 80 does not deviate from the free height of the spring. As a result, the spring 80 is kept compressed and the end of the spring 80 is kept fitted with the spring assembling part 72 of the spring pad 70.

When a bump occurs in the empty vehicle state illustrated in FIG. 1, the suspension arm 10 rotates about the bolt 50 counterclockwise in the illustrated state, the tire 30 moves upward, and the spring 80 is further compressed than in the state illustrated in FIG. 1.

Therefore, even in a normal full-bump situation in which the spring does not deviate from the free height of the spring, the upper end of the spring 80 is kept fitted with the spring assembling part 72.

Figure 5:
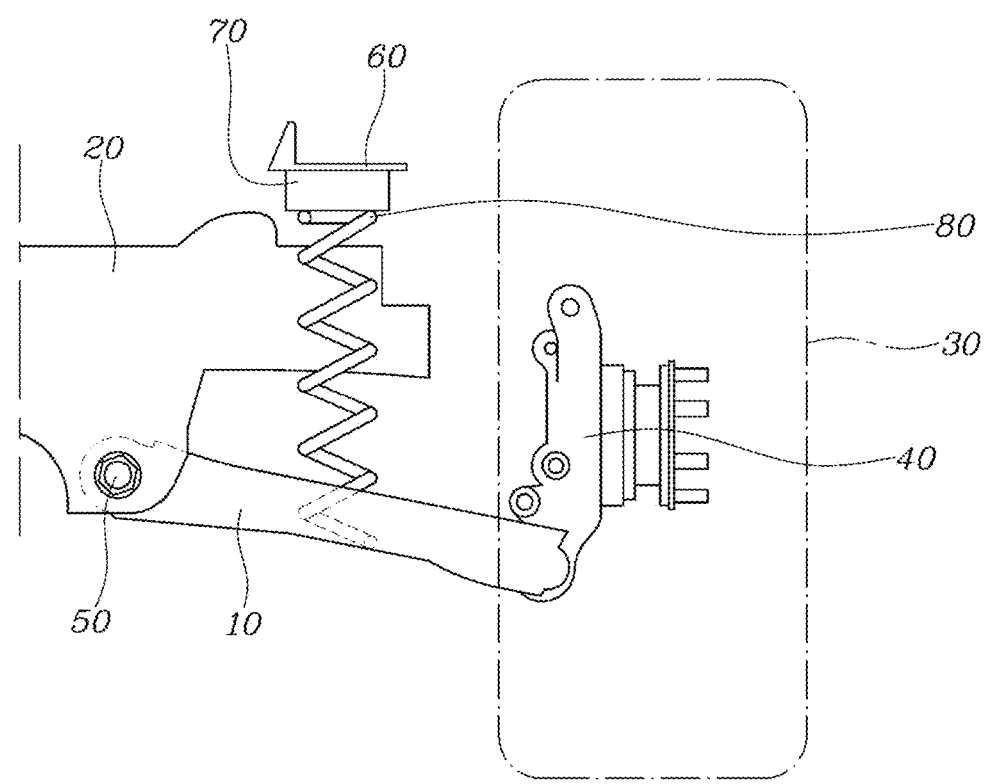
FIG. 5 is a view illustrating a full rebound state of the suspension system in FIG. 1.
Figure 6:
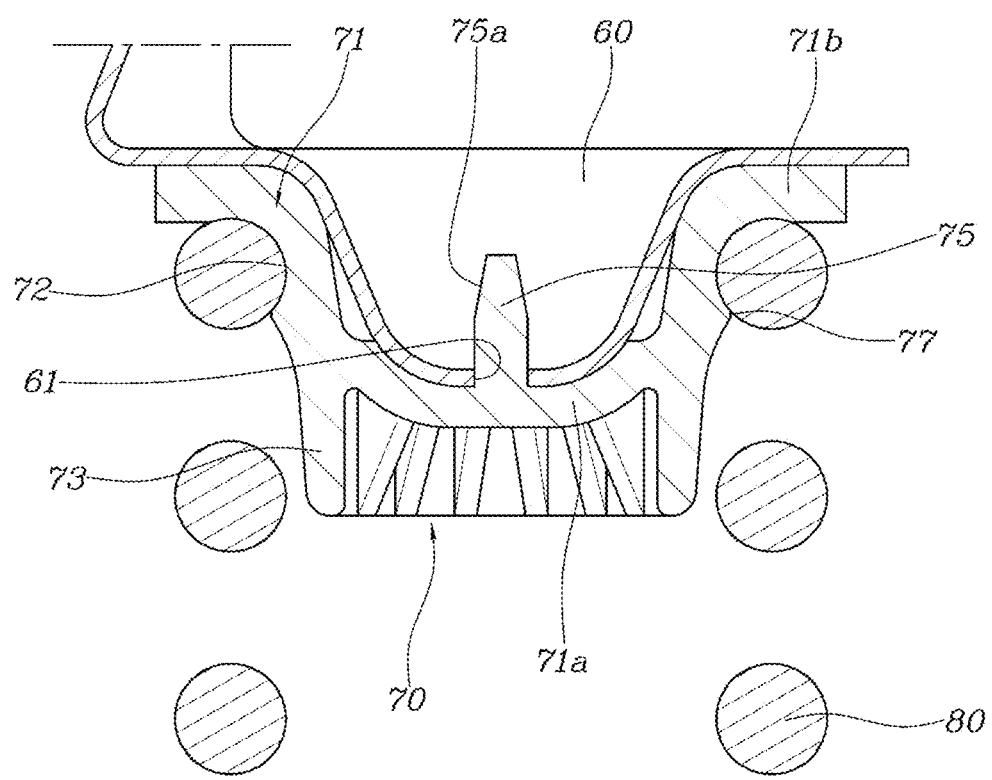
FIG. 6 is a cross-sectional view of the spring and the spring pad illustrated in FIG. 5.

FIG. 5 is a view illustrating a full-rebound state and FIG. 6 is a view illustrating states of the spring pad 70 and the spring 80 in the full-rebound state.

In the event of a full rebound in the empty vehicle state illustrated in FIG. 1, the suspension arm 10 rotates about the bolt 50 clockwise in the state illustrated in FIG. 1 and thus is positioned as illustrated in FIG. 5. Also, the tire 30 moves downward and the spring 80 is further extended than in the state illustrated in FIG. 1.

The full-rebound state is the normal state in which the spring does not deviate from the free height of the spring. Therefore, even though the full rebound occurs and the spring 80 is extended, the tensile force of the spring 80 is lower than the supporting force applied by the stepped portion 77 to support the spring 80.

Therefore, even though the spring 80 is extended in the normal full-rebound situation in which the spring does not deviate from the free height of the spring, the upper end of the spring 80 fitted with the spring assembling part 72 is supported by the stepped portion 77. The spring 80 is thus prevented from being separated from the spring assembling part 72. Therefore, the upper end of the spring 80 is continuously kept fitted with the spring assembling part 72.

Figure 7:
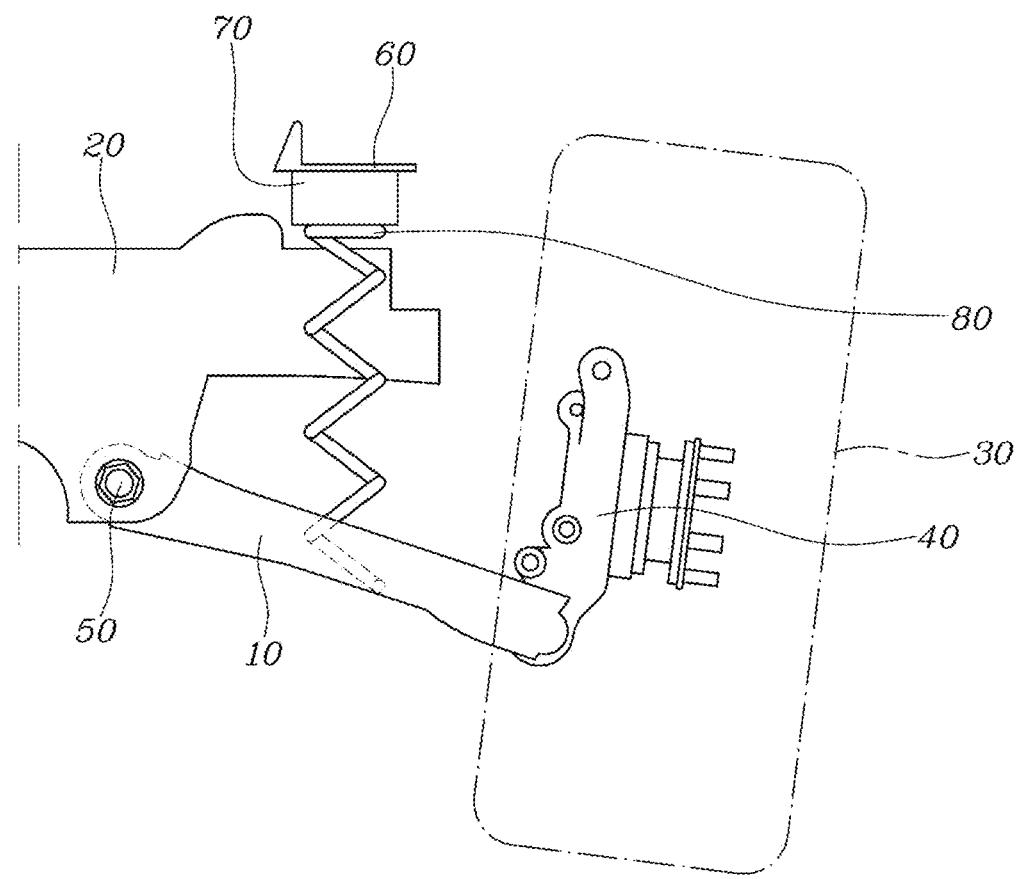
FIG. 7 is a view illustrating a state in which an additional rebound occurs in the full-rebound state illustrated in FIG. 5.
Figure 8:
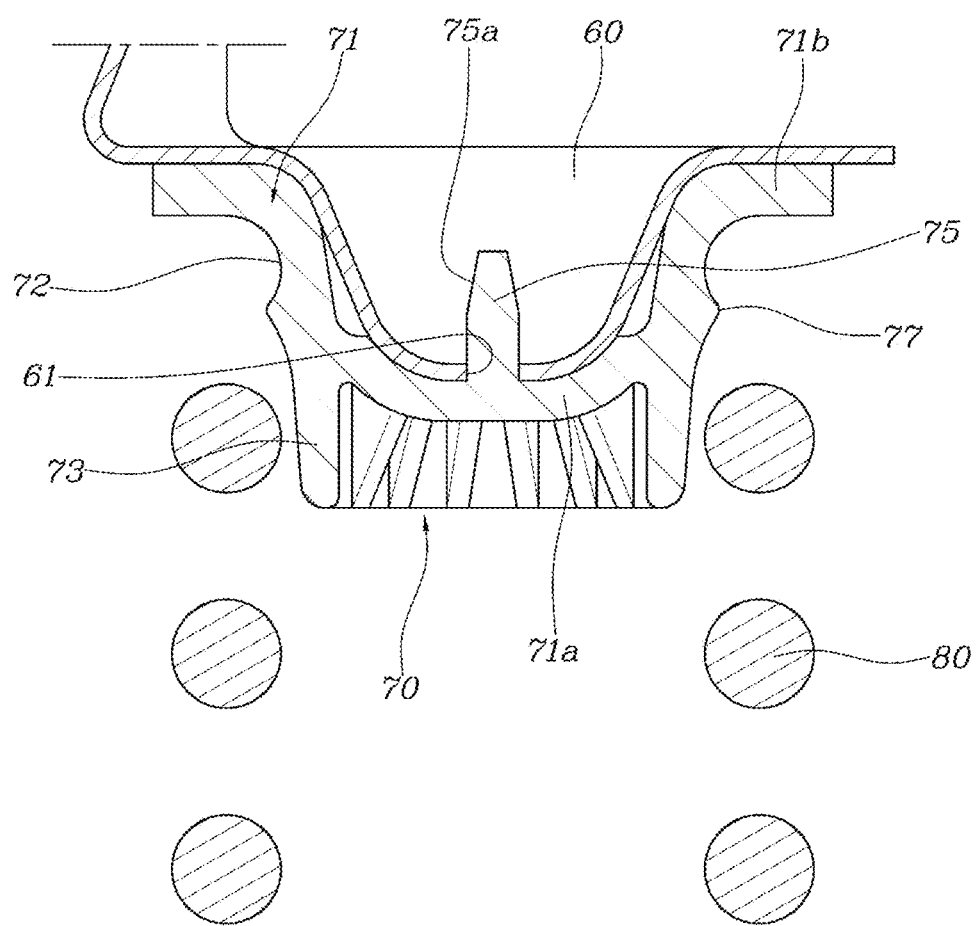
FIG. 8 is a cross-sectional of the spring and the spring pad illustrated in FIG. 7.

FIG. 7 illustrates a state in which an additional rebound occurs in the full-rebound state and FIG. 8 illustrates states of the spring pad 70 and the spring 80 when the additional rebound occurs.

When the additional rebound further occurs in the full-rebound state illustrated in FIG. 5, the suspension arm 10 further rotates about the bolt 50 clockwise in the state illustrated in FIG. 5. As a result, the amount of downward movement is further increased as illustrated in FIG. 7, the tire 30 further moves downward, and the spring 80 is further extended than in the state illustrated in FIG. 5.

The spring 80 is further extended than in the state illustrated in FIG. 5 and thus is positioned as illustrated in FIG. 7. In the case of a typical suspension system, the spring deviates from the free height of the spring and the spring 80 is withdrawn and separated.

However, in the embodiment according to the present disclosure, it is possible to prevent the upper end of the spring 80 from being completely withdrawn and separated from the spring pad 70 even though the additional rebound further occurs in the full-rebound state.

In other words, when the additional rebound further occurs in the full-rebound situation, the spring 80 is further extended than in the state illustrated in FIG. 6 and the tensile force of the spring 80 increases. In this case, the tensile force of the spring 80 is higher than the supporting force applied by the stepped portion 77 to support the spring 80 and the end of the spring 80 separates from the spring assembling part 72.

The end of the spring 80 is guided by the guide part 73 of the spring pad 70 even though the end of the spring 80 separates from the spring assembling part 72. Therefore, it is possible to prevent the spring 80 from being completely withdrawn and separated from the spring pad 70.

Further, when the situation in which the additional rebound further occurs is released in the full-rebound situation illustrated in FIGS. 7 and 8, the extended spring 80 is compressed again. Also, the end of the spring 80 guided by the guide part 73 is inserted into the spring assembling part 72 again, as illustrated in FIGS. 4 and 6, when the spring 80 is compressed. As a result, the spring 80 returns to the state in which the spring 80 is coupled to the spring pad 70.

In the embodiments according to the present disclosure as described above, the spring 80 may be prevented from being completely withdrawn and separated from the spring pad 70 even in the situation in which the additional rebound occurs in the full-rebound situation and the spring 80 deviates from the range (i.e., the free height of the spring) in which the spring 80 can be extended. As a result, it is possible to prevent the occurrence of an accident such as a rollover of the vehicle. Thus, marketability is improved by improving stability of the vehicle.

In addition, the embodiments according to the present disclosure are configured to prevent the withdrawal of the rear wheel spring in the event of the full rebound of the vehicle having a high wheel rate like a tuned and high-performance vehicle in which the handling is preferentially considered. As a result, it is possible to ensure an additional rebound stroke. In particular, it is possible to ensure excellent ride quality by improving impact shock even in the case of the high-performance vehicle.

While specific embodiments of the present disclosure have been illustrated and described, it should be apparent to those of ordinary skill in the art that the present disclosure may be variously modified and changed without departing from the technical spirit of the present disclosure defined in the appended claims.

What is claimed is:

1. A suspension system for a vehicle, the suspension system comprising a spring pad coupled to a spring configured to connect a suspension arm and a vehicle body, the spring pad being configured to support the spring,
   wherein the spring pad comprises:
   a vehicle body coupling part coupled to be in contact with the vehicle body;
   a spring assembling part formed along an outer periphery of the vehicle body coupling part, an end of the spring being inserted into the spring assembling part; and
   a guide part connected to the vehicle body coupling part and extending downward from the spring assembling part, the guide part being configured to guide a movement of the spring when the end of the spring separates from the spring assembling part and to prevent the spring from being withdrawn from the spring pad,
   wherein a vehicle body fixing protrusion protrudes upwards from a central portion of the vehicle body coupling part and is integrally formed with the vehicle body coupling part, and
   wherein the vehicle body fixing protrusion is coupled to the vehicle body while penetrating a portion of the vehicle body facing the central portion of the vehicle body coupling part.

2. The suspension system of claim 1, wherein the vehicle body coupling part comprises:
   a cup portion having a concave groove protruding downward; and
   a circular flange portion extending horizontally from an upper end of the cup portion, and
   wherein the vehicle body corresponds in shape to the cup portion and the flange portion and is installed to be in contact with an inner surface of the cup portion and an upper surface of the flange portion.

3. The suspension system of claim 2, wherein
   a plurality of debossed grooves is formed in the inner surface of the cup portion and the upper surface of the flange portion, and
   stepped structures are formed between parts in which debossed grooves of the plurality of debossed grooves are formed and parts in which debossed grooves of the plurality of debossed groove are not formed, such that surfaces of the parts in which debossed groove are not formed are in contact with the vehicle body.

4. The suspension system of claim 1, wherein
   the spring pad including the vehicle body fixing protrusion is made of a plastic material to ensure rigidity, and
   the vehicle body fixing protrusion made of the plastic material is fixedly coupled to the vehicle body by a tolerance with a hole formed through the vehicle body.

5. The suspension system of claim 1, wherein
   the spring pad including the vehicle body fixing protrusion is made of a plastic material to ensure rigidity, and
   an end of the vehicle body fixing protrusion made of the plastic material is formed as an inclined surface to improve assembly properties when the vehicle body fixing protrusion penetrates the vehicle body.

6. The suspension system of claim 1, wherein
   the spring pad including the vehicle body fixing protrusion is made of a rubber material to absorb impact and prevent noise, and
   an end of the vehicle body fixing protrusion made of the rubber material has an arrowhead shape having a slit along an axial line of the end to ensure a fixing force after the vehicle body fixing protrusion penetrates the vehicle body.

7. The suspension system of claim 1, wherein
   the spring pad including the vehicle body fixing protrusion is made of a rubber material, and
   a coating member is coupled to surfaces of the spring assembling part and the guide part to reduce friction with the spring.

8. The suspension system of claim 1, wherein
   the spring assembling part is provided in the form of a groove having an arc-shaped cross-section matched with a cross-section of the spring,
   a plurality of spring contact protrusions protrude from the spring assembling part, and
   the spring fitted with the spring assembling part is installed to be in contact with the spring contact protrusions.

9. The suspension system of claim 1, wherein a portion where a lower end of the spring assembling part and an upper end of the guide part are connected is formed as a stepped portion protruding outward, and the stepped portion supports the spring fitted with the spring assembling part.

10. The suspension system of claim 1, wherein
the spring pad is made of a rubber material, and
an inner steel member made of a steel material is coupled in the vehicle body coupling part to maintain a shape of the spring pad.

11. The suspension system of claim 1, wherein the spring is compressed and the end of the spring is kept fitted with the spring assembling part in an empty vehicle situation or in the event of a bump,
wherein the spring is extended and the end of the spring is kept fitted with the spring assembling part in a normal full-rebound situation in which the spring does not deviate from a free height of the spring, and
wherein, when an additional rebound further occurs in the full-rebound situation, the end of the spring is separated from the spring assembling part, and the end of the spring separated from the spring assembling part is guided by the guide part, such that the spring is prevented from being withdrawn from the spring pad.

12. The suspension system of claim 11, wherein, when the situation in which the additional rebound further occurs in the full-rebound situation is released, the extended spring is compressed again, and the end of the spring guided by the guide part is inserted into the spring assembling part again when the spring is compressed, such that the spring returns to a state in which the spring is coupled to the spring pad.

* * * * *